US006764114B1

(12) United States Patent
Guillon

(10) Patent No.: US 6,764,114 B1
(45) Date of Patent: Jul. 20, 2004

(54) LEAD SEAL ASSEMBLY

(75) Inventor: Jean-Louis Guillon, Migne-Auxances (FR)

(73) Assignee: Schlumberger Industires, S.A., Montrouge (FR)

( * ) Notice: Subject to any disclaimer, the term of this patent is extended or adjusted under 35 U.S.C. 154(b) by 0 days.

(21) Appl. No.: 09/807,939

(22) PCT Filed: Oct. 19, 1999

(86) PCT No.: PCT/EP99/07933

§ 371 (c)(1), (2), (4) Date: May 29, 2001

(87) PCT Pub. No.: WO00/23971

PCT Pub. Date: Apr. 27, 2000

(30) Foreign Application Priority Data

Oct. 20, 1998 (FR) ............................................ 9813181

(51) Int. Cl.[7] ............................ G09F 3/03; F16B 41/00

(52) U.S. Cl. ....................... 292/307 R; 292/327; 411/2; 411/3; 411/4; 411/5

(58) Field of Search ......................... 292/307 R, 307 B, 292/308, 316, 327; 411/2, 3, 4, 5, 910

(56) References Cited

U.S. PATENT DOCUMENTS 3,937,121 A * 2/1976 Schubert ........................ 411/2
3,963,322 A * 6/1976 Gryctko ....................... 439/814
4,021,892 A * 5/1977 Piper ......................... 24/274 R
4,149,434 A * 4/1979 Wilson ......................... 81/461
4,225,165 A * 9/1980 Kesselman ............. 292/256.67
4,331,012 A * 5/1982 Swisher ....................... 70/164
4,518,295 A * 5/1985 Matuschek .................. 411/291
4,621,230 A * 11/1986 Crouch et al. .............. 324/110
4,836,727 A * 6/1989 Volkmann ...................... 411/4
5,135,342 A * 8/1992 Scott .......................... 411/338
5,172,615 A * 12/1992 Albrecht ...................... 81/436
5,256,015 A * 10/1993 St. Clair ........................ 411/4
5,287,763 A * 2/1994 Nagashima .................. 74/493
5,306,054 A * 4/1994 Georgopoulos ......... 292/307 R
5,402,958 A * 4/1995 Mahaney ................. 242/388.1
5,554,834 A * 9/1996 Ellett ....................... 200/82 A
5,567,096 A * 10/1996 Howard ....................... 410/42
5,647,253 A * 7/1997 Pozek .......................... 81/125
5,697,743 A * 12/1997 Parker ........................... 411/5
5,875,606 A * 3/1999 Jensen ..................... 52/741.41
5,899,123 A * 5/1999 Lukes ............................ 81/54
5,971,987 A * 10/1999 Huxel et al. .................. 606/73
5,988,966 A * 11/1999 Chen et al. ................. 411/372

FOREIGN PATENT DOCUMENTS

GB 2 067 699 A 7/1981
GB 2140523 A * 11/1984 ........... F16B/31/02

* cited by examiner

*Primary Examiner*—Robert J. Sandy
*Assistant Examiner*—Thomas Ho
(74) *Attorney, Agent, or Firm*—Straub & Pokotylo; Michael P. Straub

(57) ABSTRACT

A sealing assembly designed to co-operate with a screw provided with a tightening slot by being mounted therein in such a manner that once said assembly is sealed the tightening slot is hidden in a manner that is not reversible except by destroying the seal, and further comprising a breakable drive suitable when the sealing assembly is subjected to a tightening action, for driving the screw in a tightening direction inside a receptacle provided for this purpose and for breaking once the screw becomes blocked, so as to prevent any loosening action being applied via the breakable drive.

15 Claims, 5 Drawing Sheets

LEAD SEAL ASSEMBLY

The present invention relates to a sealing assembly which is advantageously applicable in meters, e.g. water, gas, electricity or heat meters. It also relates to a sealing device including such an assembly and to a meter including such a device.

BACKGROUND OF THE INVENTION

In general, it is desired to ensure that an apparatus is kept safe when the apparatus is in the possession of a user who might seek to dismantle it for dishonest purposes. This applies in particular to meters for water, gas, electricity, or heat, where such meters are generally protected by seals.

Seals are known that are constituted by metal wires passing through a sealing device co-operating with the apparatus in question and having a metal endpiece at their ends, which endpiece is usually made of lead.

As a general rule, with electricity meters, sealing devices are used to seal the covers or terminal caps of the meter to their supports. Traditionally, the head of a screw is pierced by a diametral bore, and after the screw has been tightened, this bore is put into register with two radial setbacks that are in alignment and formed by a groove in the recess provided in the terminal cover to receive the head of the screw. A steel wire is then passed through the first setback, into the bore of the head, and then into the second setback. Thereafter both ends of the wire are embedded in a piece of lead. Thus, any attempt at loosening the screw automatically leads to the steel wire becoming unsealed or sheared since the two strands of the wire on either side of the head of the screw are both prevented from turning by the corresponding setbacks and they are both embedded in the lead.

An initial seal is put into place in the factory or on the user's premises by the installer of the meter, once it has been checked that the meter is properly calibrated.

Thereafter, only authorized personnel are entitled to remove the seal. This applies to personnel involved with meter maintenance and repair, and once they have done their work, they put a new seal on the meter using sealing pliers that generally include the stamp of some official body.

Unfortunately, such sealing pliers carried by maintenance personnel can be purloined by users seeking to open a meter for fraudulent purposes and then have the possibility of closing it again complete with its seal before the visit of a meter reader.

OBJECTS AND SUMMARY OF THE INVENTION

The present invention makes it possible to reduce quite considerably the possibility of this type of situation by not giving installation and maintenance personnel sealing devices suitable for making a seal on the user's premises, but instead giving them devices that are factory-sealed and ready for mounting in a manner that is not reversible without breaking the seal.

For this purpose, the sealing assembly of the invention is designed to co-operation with a screw provided with tightening means by being mounted therein in such a manner that once said assembly is sealed said tightening means are hidden in a manner that is not reversible except by destroying the seal, and further comprising breakable drive means suitable when the sealing assembly is subjected to a tightening action, for driving the screw in a tightening direction inside a receptacle provided for this purpose and for breaking once the screw becomes blocked, so as to prevent any loosening action being applied via the breakable drive means.

This assembly presents the advantage of enabling the material used for sealing purposes, usually lead, to be replaced with brass, aluminum, or plastic.

For environmental reasons it is preferable to avoid using lead. In addition, since lead is a soft material, it remains possible to open a seal without damaging the seal in visible manner, thereby opening the way to fraud.

Performing the sealing operation in a factory makes it possible firstly to use machines that are more sophisticated than a pair of pliers, so each seal can be marked with information such as: serial number; identity of distributor or installer; . . . . This makes it possible to keep a record of and to trace all seals made in this way.

In addition, sealing operations performed in the factory can be automated.

In an advantageous variant, the sealing assembly comprises a first piece in the form of a bushing suitable for being mounted to rotate freely on the shank of a screw.

Advantageously, the sealing assembly comprises closure piece designed to co-operate with the first piece to hide the tightening means of the screw.

In a particular embodiment, said breakable drive means are integrally formed with the closure piece.

In a variant embodiment, said breakable drive means comprise a peripheral element connected to the closure piece via at least one breakable strand.

In another variant embodiment, the breakable drive means comprise a peripheral element connected to the bushing via at least one breakable strand.

Advantageously, the breakable drive means comprise a key suitable for co-operating with the tightening means of the screw.

In a particular embodiment, said key is breakable.

In a variant embodiment, a sealing plate is provided to co-operate with the first piece in such a manner as to prevent access to the closure piece.

In a particular embodiment, the first piece has through means for passing a sealing wire, and the closure piece has through means suitable for co-operating with the through means of the first piece for passing a sealing wire.

Advantageously, the clamping means are designed to co-operate with a tightening tool.

The present invention also provides a sealing device comprising such a sealing assembly mounted on a screw.

Compared with traditional devices, this sealing device presents the advantage of being capable of using ordinary screws that are not pierced by a bore.

The present invention also provides a meter including such a sealing device. The meter can be installed on the user's premises and can be sealed without sealing being performed on site; nevertheless, if so desired, sealing can still be done at the user's premises.

BRIEF DESCRIPTION OF THE DRAWINGS

Other characteristics and advantages of the invention appear from the following description given by way of non-limiting indication and made with reference to the accompanying drawings, in which.

MORE DETAILED DESCRIPTION

Figures 1A, 1B:
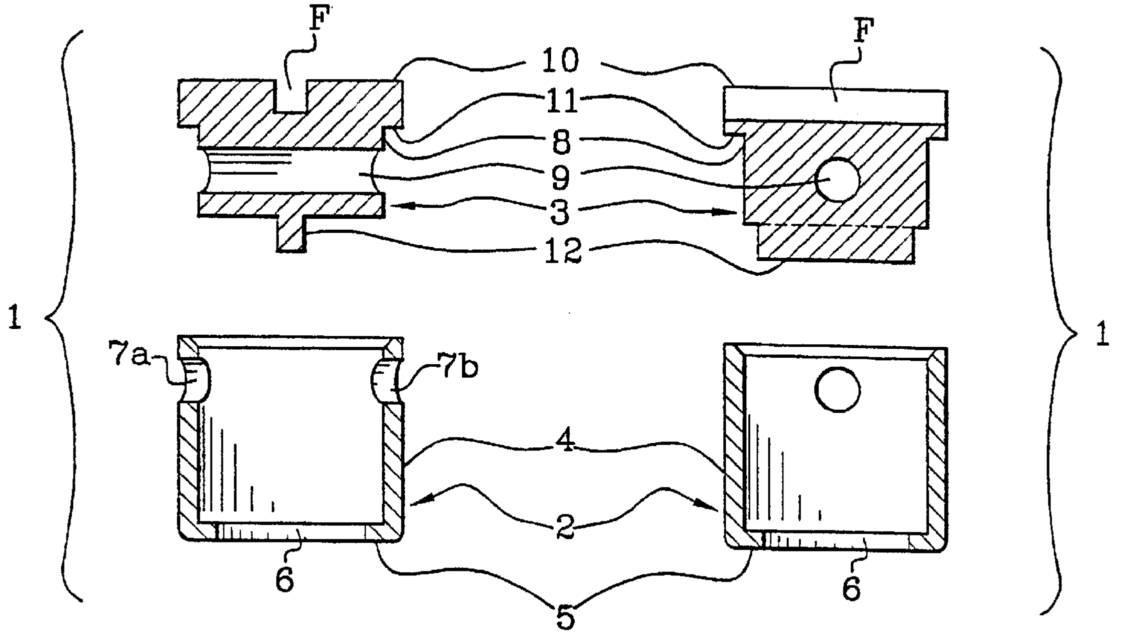
FIGS. 1*a* and 1*b* are two exploded section views on two mutually perpendicular planes showing a sealing assembly of the invention.

FIGS. 1*a* and 1*b* are diagrams of a sealing assembly 1 of the invention constituted by a first piece 2 in the form of a bushing and a closure piece 3, which pieces are suitable for co-operating with each other. The first piece can be made of aluminum, brass, stamped or turned steel, or indeed of molded plastics material. The closure piece can be made of alpax or any other injected aluminum alloy, of aluminum, of turned brass, or indeed of molded plastics material.

The first piece 2 is constituted by a side wall 4 and an end wall 5. The end wall is pierced by an opening 6 to allow the shank of a screw (not shown in FIGS. 1*a* and 1*b*) to be passed through, with the side wall 10 then forming a receptacle suitable for receiving the head of the screw.

The side wall 4 has through means 7*a* and 7*b* for passing a sealing wire (not shown in FIGS. 1*a* and 1*b*) said means being formed by two diametrically opposite openings in the top portion of the side wall 4.

The closure piece 3 has a bottom portion 8 designed to engage in the receptacle formed by the first piece. The bottom portion 8 is pierced by a bore 9 forming through means for passing a sealing wire. The open ends of the bore are situated in such a manner that when the closure piece 3 is engaged in the first piece 2, they can be brought into register with the openings 7*a* and 7*b*.

The closure piece 3 has a top portion 10 with a shoulder 11 for bearing against the top end of the side wall 4 of the first piece 2 when the closure piece 3 is engaged in the bushing.

The sealing assembly has breakable drive means which, in the embodiment shown in FIGS. 1*a* and 1*b*, are supported by the bottom portion 8 on the face thereof that faces the end wall 5 of the first piece. In the example shown, these breakable drive means are constituted by a diametrically-extending key 12 in the form of a rectangular parallelepiped. In the embodiment shown in FIGS. 1*a* and 1*b*, the key is integral with the closure piece 3.

The sealing assembly also has tightening means carried in the example shown by the closure piece 3 in its top portion 10 as constituted by a slot F suitable for co-operating with a tightening tool, and specifically a screwdriver (not shown).

Figure 2:
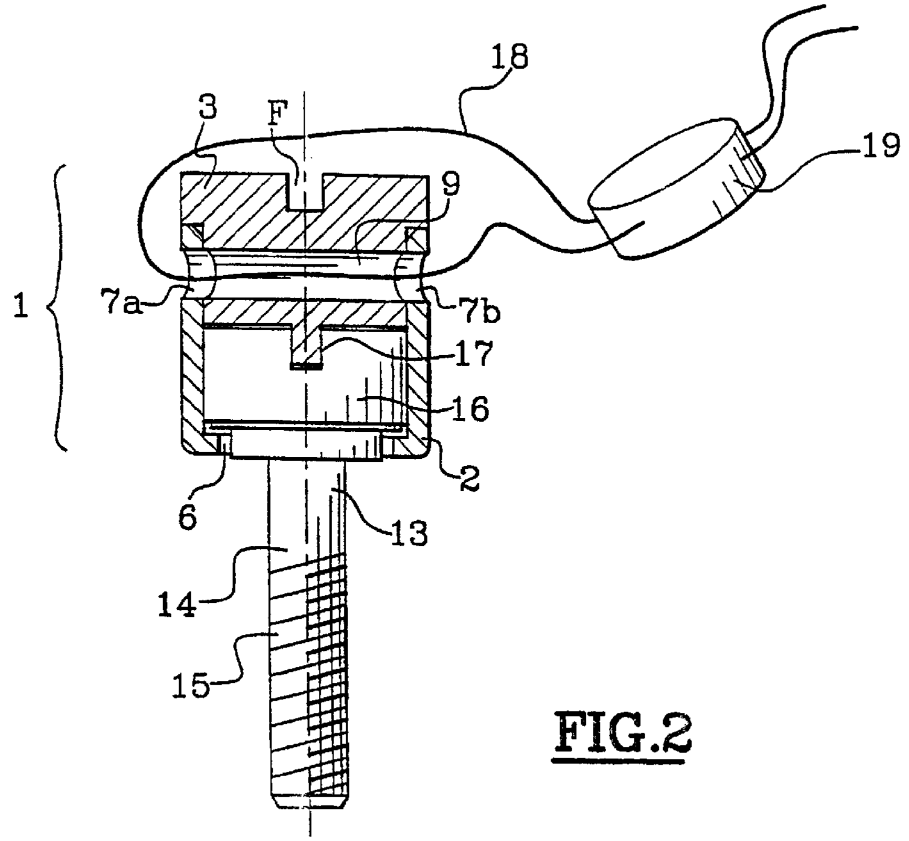
FIG. 2 is a diagrammatic section view of an assembly of the invention mounted on a screw and sealed.

FIG. 2 is a diagram of a sealing device of the invention comprising a sealing assembly mounted on a stepped screw 13.

The screw 13 mainly comprises a shank 14 having a thread 15 covered at one end by a head 15 including tightening means 17, in this case a single slot.

The screw 13 is inserted into the first piece 2 in such a manner that the shank 14 extends through the opening 6 while the head 16 rests inside the receptacle formed by the side wall 4 of the bushing. The first piece is thus free to rotate around the shank 14.

The closure piece 3 is inserted into the bushing so that the breakable drive means, in this case the key 12, penetrate into the slot 17 in the screw. It will be understood that the dimensions of the key are matched to the type of screw selected.

In this disposition, the through means of the first piece 2 and of the closure piece 3 are in register so as to enable a sealing wire 18 to be inserted. The ends of the sealing wire 18 are embedded in a seal 19, e.g. made of lead or of any other suitable material, and the piece 3 is secured to the first piece 2.

This provides a sealing device which is easily put into place to close a meter installed on user premises.

The closure piece 3 positioned in the first piece 2 enables the tightening means of the screw to be hidden, and to do so in a manner that cannot be reversed without destroying the sealing assembly or removing the sealing wire. The wire can be removed only by breaking the wire or by breaking the seal.

With reference to FIGS. 3*a* to 3*d*, there follows a description of how the device with the incorporated seal can be installed on a meter. In these figures, the meter is shown in part only, reference S designating the body of the meter while reference C designates the terminal cover or lid that is to be fixed to the body.

The cover C has a through hole 20 for passing the shank 14 of the screw 13, which hole is surmounted by a housing 21 suitable for receiving the first piece 2 constituting the bushing. In the example shown, this housing is such that when the screw fitted with the sealing assembly is inserted therein, the through means 7*a* and 7*b* and thus the sealing wire 18 are flush with the outside wall 22 of the cover C.

The body S has a receptacle 23 with tapping 24 suitable for co-operating with the thread 15 on the screw so as to enable the screw to be tightened by means of a screwdriver 25 engaging the slot F in the closure piece 3. The key 12 co-operates with the slot 17 in the screw and the first piece 2 is secured to the closure piece 3 by means of the sealing wire 18 so any rotation applied to the closure piece 3 by the screwdriver 25 causes the entire device to rotate.

Figure 3A:
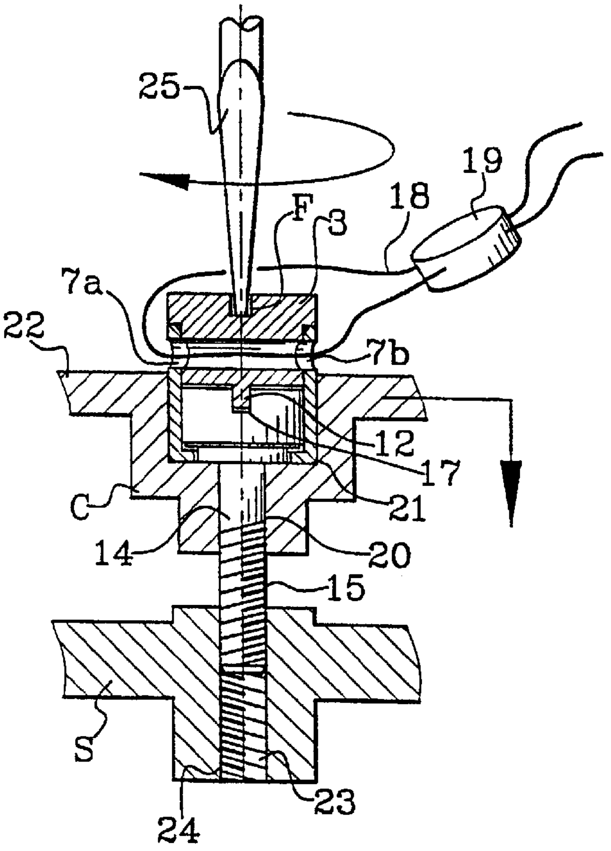
FIGS. 3*a* to 3*d* are diagrams showing a sequence of operations for sealing a meter.
Figure 3B:
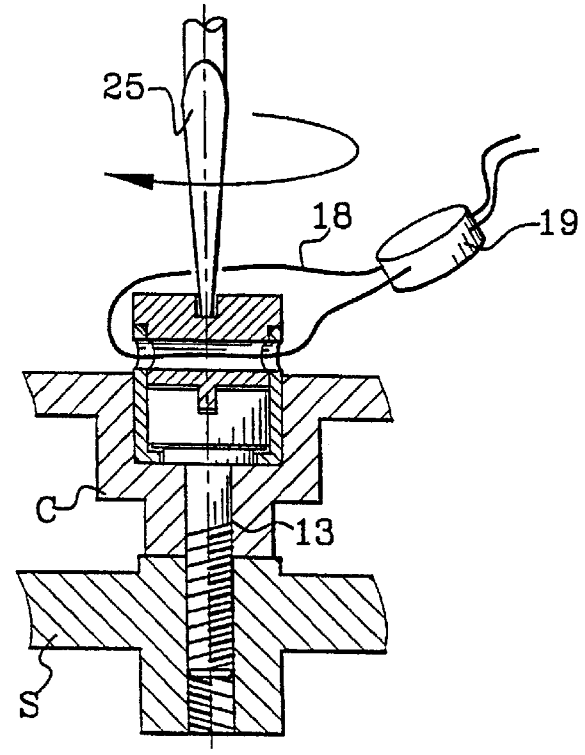

FIG. 3*b* is a diagram showing the cover C fixed to the body S by means of the screw fitted with the sealing assembly. The screw 13 has thus reaches its blocking point.

Figure 3C:
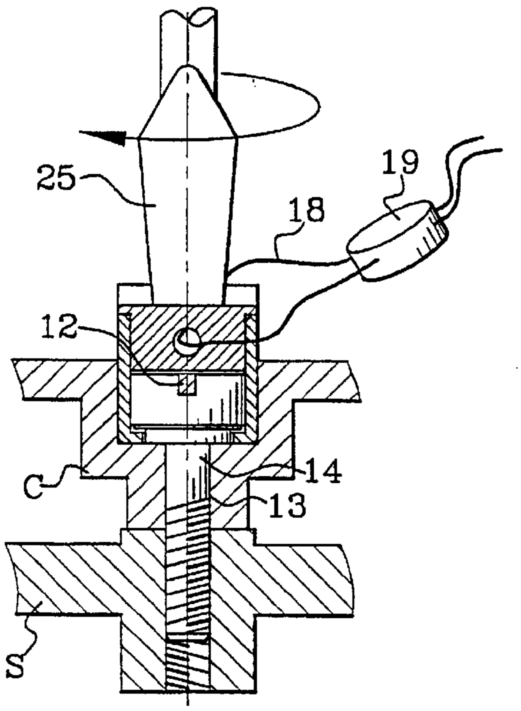

FIG. 3*c* is a diagram showing the same device when subjected to tightening action once the screw 13 has become blocked. As continued tightening force is applied, the breakable drive means, in this case the key 12, break, thus releasing the sealing assembly (which is held together by the sealing wire 18) free to rotate about the shank 14 of the screw 13. The material selected for making the key and the dimensions thereof enable the tightening force required for breaking the key to be determined and adapted by calculating appropriate shear strength.

Figure 3D:
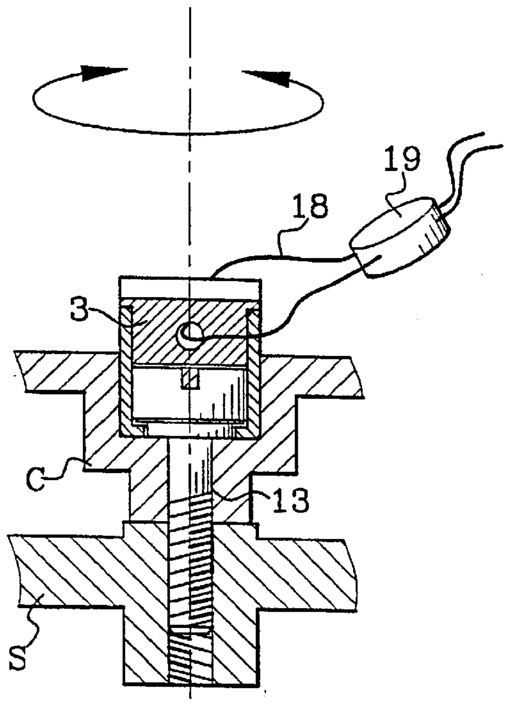

As shown diagrammatically in FIG. 3*d*, once the key is broken, it is no longer possible to loosen the screw 13 without breaking either the seal 19 or the wire 18, or indeed the entire sealing assembly. The means for tightening the screw 13 are hidden by the closure piece 3 in a manner that is not reversible.

The meter is thus sealed, and it can be detected that it has been opened by observing the sealing device and the wire fitted with the seal.

FIGS. 4*a* to 4*e* are diagrams showing the operations required for undoing the device in order to open the meter.

Figure 4A:
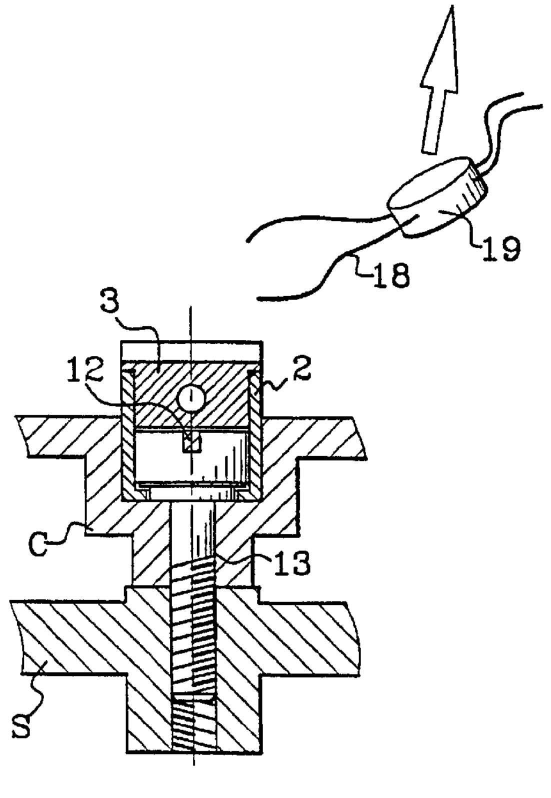
FIGS. 4*a* to 4*e* are diagrams showing a sequence of operations for opening a meter that includes a sealing device of the invention.

As shown diagrammatically in FIG. 4*a*, it is necessary firstly to break the sealing wire 18 and to withdraw the sealing assembly. The closure piece 3 is then no longer secured to the first piece 2.

Figure 4B:
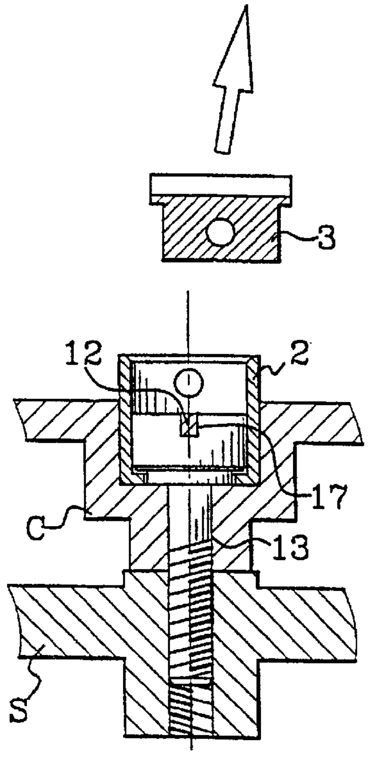

As shown diagrammatically in FIG. 4*b*, the closure piece 3 is then removed. The broken key 12 remains in the slot 17.

Figure 4C:
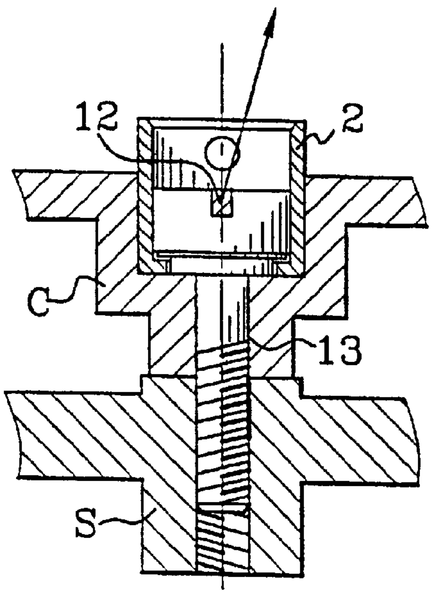
Figure 4D:
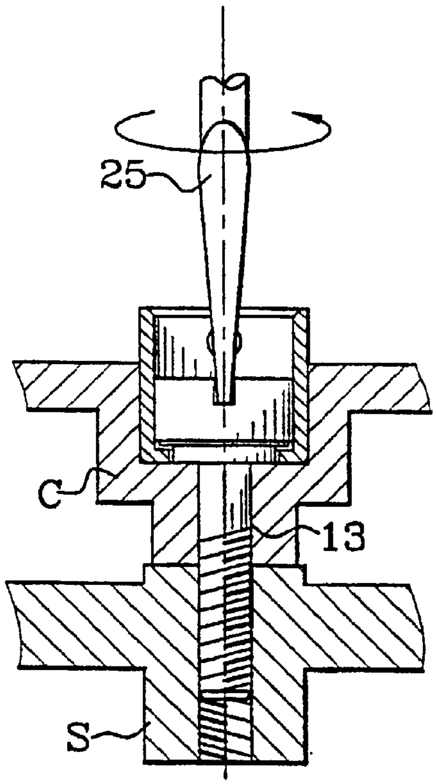
Figure 4E:
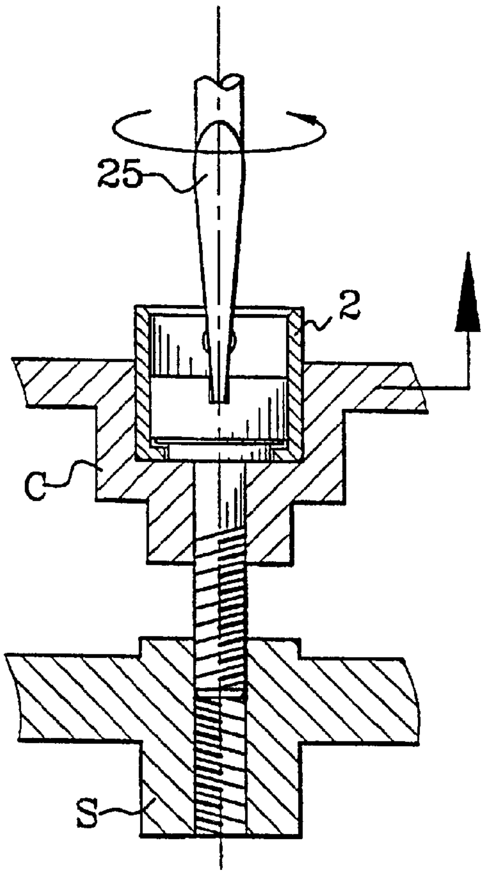

The next step is shown diagrammatically in FIG. 4*c* and consists in removing the broken key 12. At this stage, the means 17 for tightening the screw 13, i.e. its slot, become visible. As shown in FIGS. 4*d* and 4*e*, loosening drive applied by a screwdriver 25 to the screw enables the lid C to be withdrawn.

In the embodiment shown above, the breakable drive means are disposed on the closure piece. It would not go beyond the ambit of the present invention to provide for the first piece to support these breakable drive means. By way of example, the breakable drive means can be constituted by a fin disposed on the side wall in the bottom portion of the first piece. A lateral slot then needs to be provided in the head of the screw to co-operate with said fin. A tightening action enables the assembly to be driven until the screw becomes blocked. Continued tightening action then breaks the fin thus preventing the screw from being loosened.

In this embodiment, one or more fins can be disposed on the side wall in the top portion of the bushing to co-operate with slots provided in the sides of the closure piece. This or these fins, when driven by a tightening tool, enable the first piece to be driven, and thus enable the screw to be driven, so long as the breakable drive means have not been broken.

Figure 5:
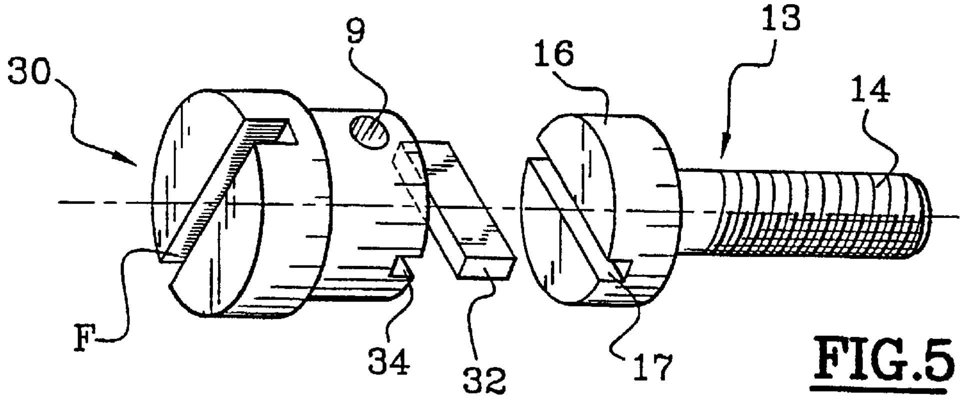
FIG. 5 is a diagram showing a variant embodiment of a device of the invention.

FIG. 5 shows a portion of another variant embodiment of the invention in which the key forming the breakable drive means 32 is separate from the closure piece 30. The closure piece has a slot 34 forming a housing for receiving said key. The remainder of the device is identical to that described above.

Figure 6:
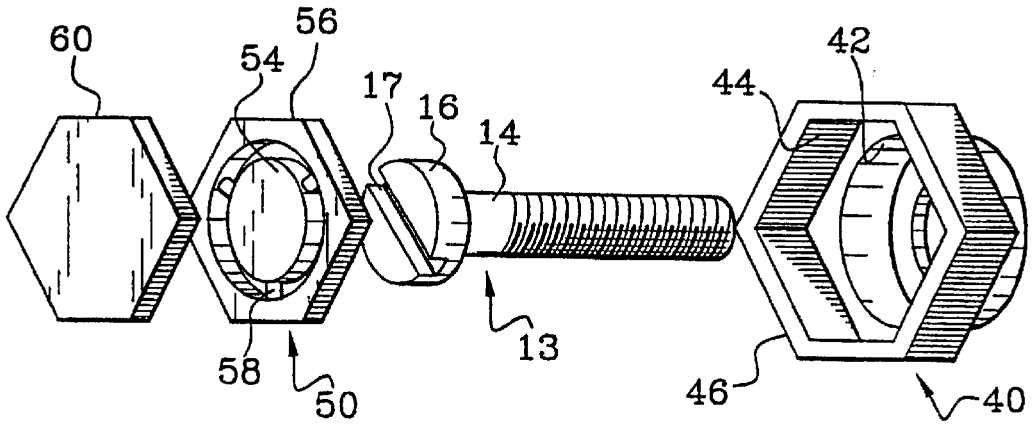
FIG. 6 is a diagrammatic exploded view of a variant embodiment of a device of the invention.

FIG. 6 is an exploded diagram of another variant embodiment of a device of the invention. This variant makes it possible to avoid using a sealing wire.

A first piece 40 in the form of a bushing has an end wall with an opening enabling said first piece to be mounted so as to rotate freely on the shank 14 of a screw 13. A housing 42 is provided to receive the head of the screw 16. The top end of the first piece forms a receptacle 44 for receiving the closure piece. The tightening means 46 are constituted by the hexagonal shape of the wall of the receptacle 44 thus enabling it to co-operate with a hexagonal wrench (not shown) for tightening the screw 13.

Naturally, some other number of sides could be used in providing the shape of this wall.

Figure 7:
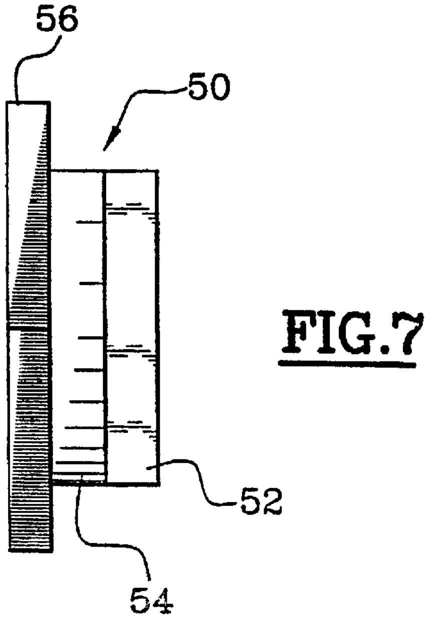
FIG. 7 is a diagrammatic side view of the closure piece of the FIG. 6 device.

The closure piece 50 is shown in side view in FIG. 7. It has a key-shaped projection 52 for co-operating with the slot 17 in the screw 13. This key is connected to a portion 54 of the closure piece that acts as a support. A peripheral element in the form of a hexagonal ring 56 is connected to the support 54 via three breakable strands 58. The hexagonal shape of the peripheral element 56 corresponds to the hexagonal shape of the receptacle 44 of the first piece 40. In this way, the closure piece engages in the receptacle.

Using an appropriate wrench acting on the first piece 40, the screw 13 is driven so as to be tightened via the closure piece 50. Once the screw 13 has become blocked, continued tightening force breaks the breakable strands 58, thereby releasing the assembly formed by the peripheral element 56 (now separate from the support 54) and the first piece 40 of the assembly formed by the closure piece 50 engaged in the screw 13.

A sealing plate 60, preferably a transparent plate, of shape corresponding to the shape of the receptacle 46 is crimped in said receptacle so as to seal the assembly. This plate 60 can advantageously be used as a medium on which information is marked such as a serial number, a date, . . . .

For release purposes, it is necessary to break the sealing plate 60 which gives access to the screw 13 once the peripheral element 56 has been removed together with the support 54. The integrity of the seal is thus easily verified by inspecting the state of the sealing plate.

In another variant (not shown), the peripheral element can be connected to the first piece via one or more breakable strands. Under such circumstances, the closure piece must be of a shape that is suitable for co-operating with the peripheral element so that the screw is properly rotated during tightening. Once the screw becomes blocked, breaking the breakable strands separates the peripheral element from the first piece. Tightening or loosening action applied to the first piece then no longer acts on the screw.

What is claimed is:

1. A sealing assembly designed to co-operate with a screw provided with tightening means by being mounted thereon in such a manner that once said assembly is sealed said tightening means are hidden in a manner that is not reversible except by destroying the seal, said screw including a head and a shaft, said shaft being attached to and extending perpendicularly to said head, and further comprising breakable drive means, physically separate from said screw, suitable when the sealing assembly is subjected to a tightening action, for driving the screw in a tightening direction inside a receptacle provided for this purpose and for breaking once the screw becomes blocked, so as to prevent any loosening action being applied via the breakable drive means, wherein said breakable drive means is suitable for cooperating with the tightening means of said screw and extends at least partially into a center portion of said head, said center portion of said head being above a center of said shaft.

2. A sealing assembly according to claim 1, comprising a first piece in the form of a bushing suitable for being mounted to rotate freely on the shank of a screw.

3. A sealing assembly according to claim 2, including a closure piece designed to co-operate with the first piece to hide the tightening means of the screw.

4. A sealing assembly according to claim 3, in which said breakable drive means are integrally formed with the closure piece.

5. A sealing assembly according to claim 4, in which said breakable drive means comprise a peripheral element connected to the closure piece via at least one breakable strand.

6. A sealing assembly according to claim 2, in which the breakable drive means comprise a peripheral element connected to the bushing via at least one breakable strand.

7. A sealing assembly according to claim 1, in which the breakable drive means comprise a key suitable for co-operating with the tightening means of the screw.

8. A sealing assembly according to claim 7, in which said key-is breakable.

9. A sealing assembly according to claim 3, in which a sealing plate is provided to co-operate with the first piece in such a manner as to prevent access to the closure piece.

10. A sealing assembly according to claim 1, in which the first piece has through means for passing a sealing wire, and in which the closure piece has through means suitable for co-operating with the through means of the first piece for passing a sealing wire.

11. A sealing assembly according to claim 1, wherein said sealing assembly is mounted on a screw.

12. A sealing assembly according to claim 11, wherein said sealing assembly is mounted on a portion of a meter.

13. A sealing assembly according to claim 6, wherein the peripheral element of the breakable drive means is connected to the bushing via a plurality of breakable strands.

14. A sealing assembly according to claim 7, wherein said key is rectangular and flat.

15. A sealing assembly according to claim 14, wherein said tightening means is a slot, said key fitting into said slot.

* * * * *